United States Patent
Uchida

(10) Patent No.: US 6,478,945 B1
(45) Date of Patent: Nov. 12, 2002

(54) METHOD FOR PRODUCING HIGHLY PURE ALUMINUM PRIMARY BASE METAL

(75) Inventor: Hiroshi Uchida, Shizuoka (JP)

(73) Assignee: Nippon Light Metal Co., Ltd., Tokyo (JP)

( * ) Notice: Subject to any disclaimer, the term of this patent is extended or adjusted under 35 U.S.C. 154(b) by 0 days.

(21) Appl. No.: 09/622,473
(22) PCT Filed: Sep. 9, 1999
(86) PCT No.: PCT/JP99/04907
§ 371 (c)(1),
(2), (4) Date: Aug. 17, 2000
(87) PCT Pub. No.: WO00/36186
PCT Pub. Date: Jun. 22, 2000

(30) Foreign Application Priority Data

Dec. 17, 1998 (JP) .......................................... 10-358643

(51) Int. Cl.⁷ .............................. C25C 3/06; C25C 3/08
(52) U.S. Cl. ........................................ 205/389; 205/392
(58) Field of Search .................................. 205/392, 389

(56) References Cited

U.S. PATENT DOCUMENTS

| | | | | |
|---|---|---|---|---|
| 2,998,375 A | * | 8/1961 | Peterson et al. | 204/294 |
| 4,072,599 A | | 2/1978 | Bullough et al. | |
| 4,096,097 A | * | 6/1978 | Yan | 252/510 |
| 4,465,659 A | * | 8/1984 | Cambridge et al. | 423/495 |
| 4,559,215 A | * | 12/1985 | Loutfy et al. | 423/496 |

FOREIGN PATENT DOCUMENTS

| | | |
|---|---|---|
| EP | 252859 A | 1/1988 |
| FR | 2639041 | 3/1977 |
| GB | 1569033 | 6/1980 |
| JP | 175807 B | 11/1949 |

OTHER PUBLICATIONS

Sushkov et al.:"Aluminum Metallurgy". Moscow, 1965, pp. 66–67, (No month).

Gillebrand et al.: "Practical Handbook On Inorganic Analysis". Moscow, 1960, pp. 688–689, (No month).

Kolodin et al.: "The Production Of Calcinated Anodes Of Aluminum Electrolyzers". Moscow, 1980, pp. 21–22, (No month).

* cited by examiner

Primary Examiner—Donald R. Valentine
(74) Attorney, Agent, or Firm—Gibbons, Del Deo, Dolan, Griffinger and Vecchione

(57) ABSTRACT

The present invention provides a method of producing a highly pure aluminum primary base metal having a purity of at least 99.95 wt % (3N5), or a still higher purity close to the 4N that is a purity value of a secondary refined base metal.

Alumina, the Si component of which is decreased by acid cleaning, is placed in a Hall-Heroult electrolysis cell as a main raw material. An aqueous solution of sulfuric acid, an aqueous solution of sulfuric acid plus hydrofluoric acid, or the like is used for acid cleaning. In order to remove Si, an acidic aqueous solution heated to at least 40° C. is preferred. Use of deashed coke and/or pitch as a carbon material for anode in addition to the use of acid-cleaned alumina produces a highly pure aluminum primary base metal in which the Si and Fe components are further decreased.

4 Claims, 2 Drawing Sheets

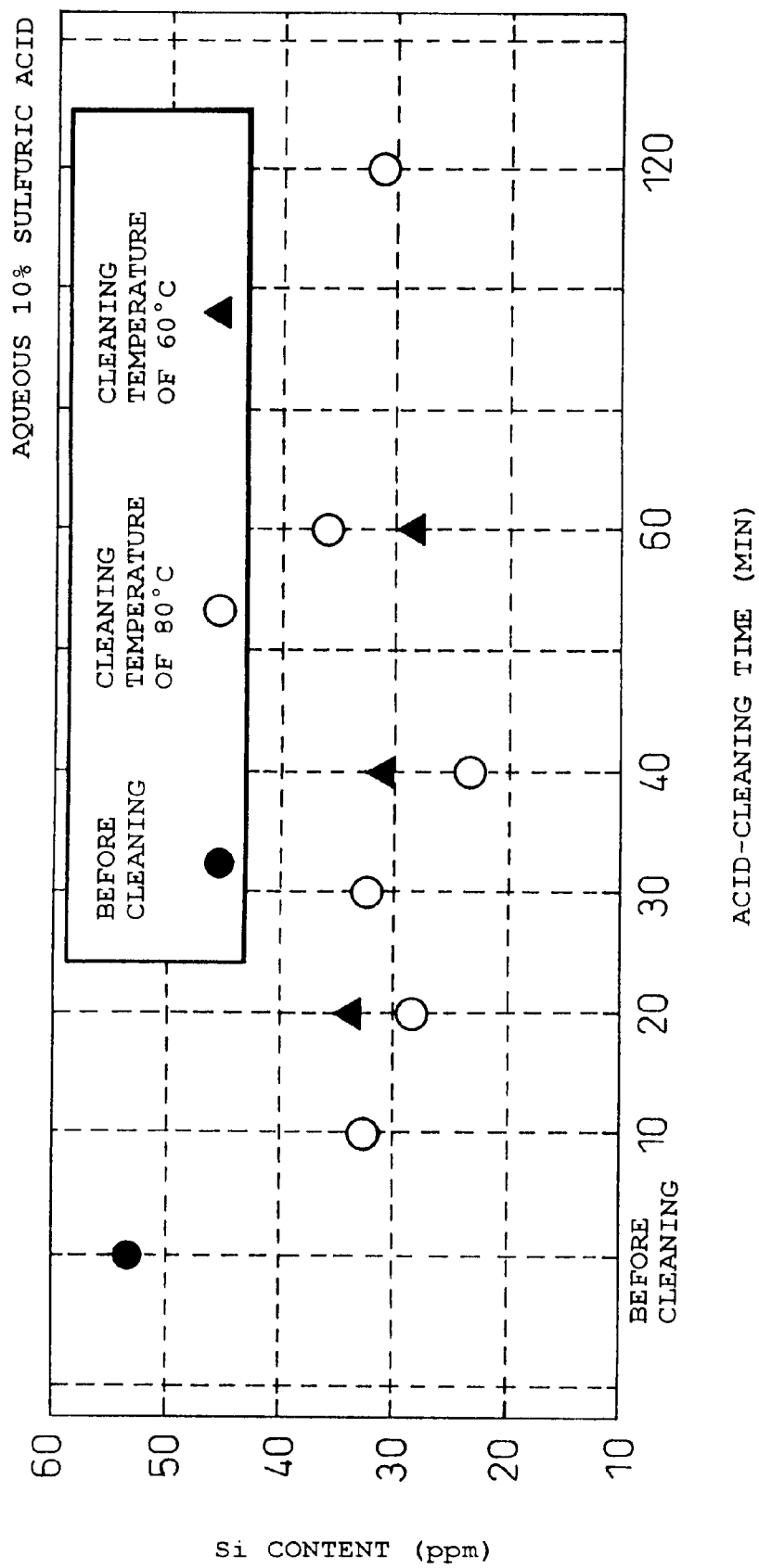

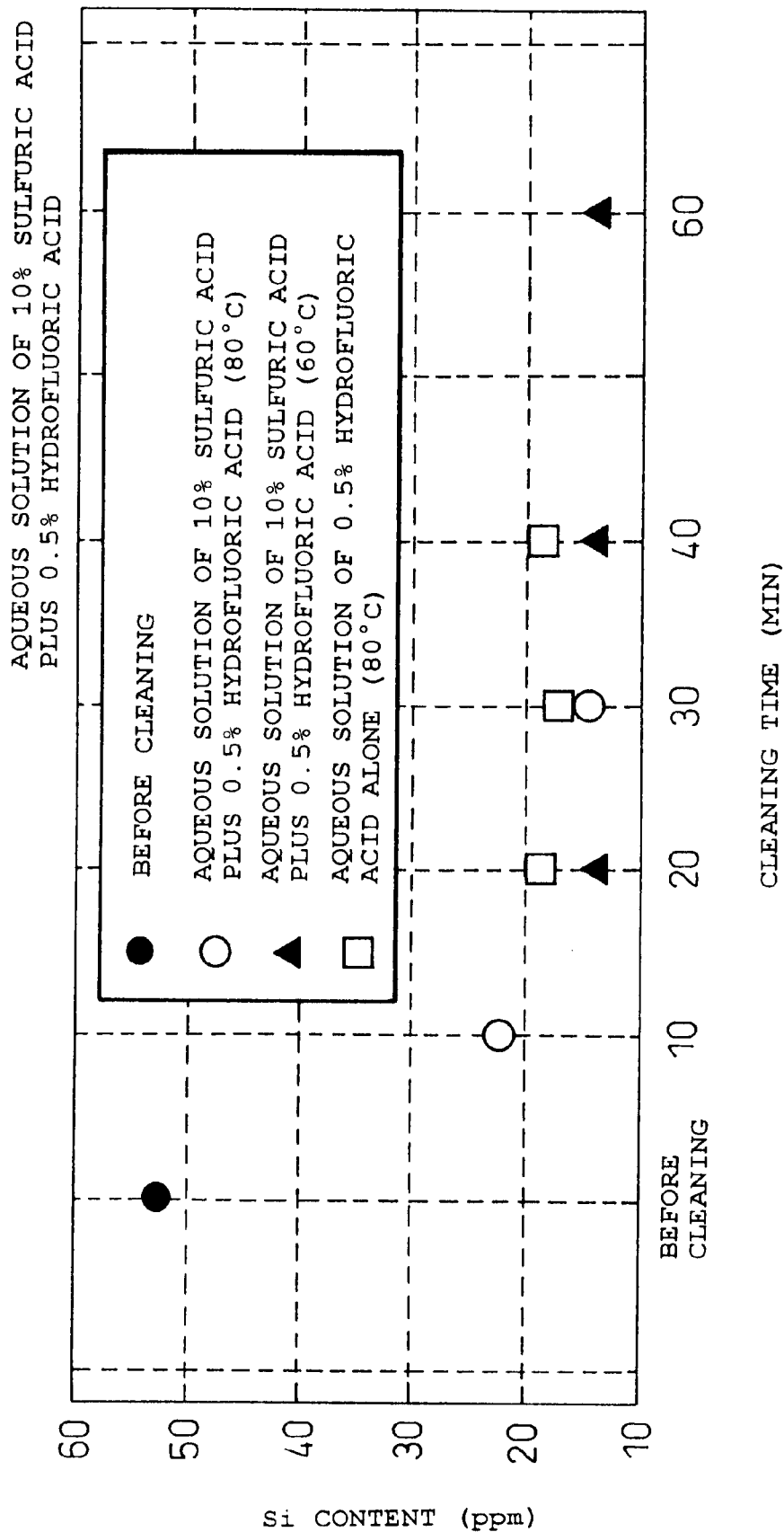

METHOD FOR PRODUCING HIGHLY PURE ALUMINUM PRIMARY BASE METAL

TECHNICAL FIELD

The present invention relates to a method of producing an aluminum primary base metal by electrolysis.

BACKGROUND ART

An aluminum base metal has been principally produced by Hall-Heroult electrolysis. In Hall-Heroult electrolysis, alumina, that is aluminum oxide, and a carbon material for an anode are used as a main raw material and an additive raw material, respectively.

Alumina is usually prepared from alumina-containing ore such as bauxite by alkali extracting and calcining, and is supplied as powder to an electrolysis cell. Alumina prepared in such a manner as explained above usually has a purity of about 98.5 wt %. The alumina has a moisture content and contains from several tens to several hundred of ppm each of metal oxides such as Fe, Si, Ga, V and Ti as shown in Table 1.

The carbon material for anode used as an additive raw material is prepared by mixing calcined coke and a binder in a predetermined proportion and compacting the mixture into briquettes, and is supplied to the top of the anode of an electrolysis cell. Moreover, these materials are sometimes compacted and fired in advance, and set in the electrolysis cell. The carbon material for anode is consumed as the electrolytic reduction of alumina (aluminum oxide) proceeds. The carbon material used in the anode is a mixture of coke and pitch, and contains about several hundred ppm each of oxides such as Fe, Si, V and Ti. This is because the ordinary purity of coke and pitch is as shown in Table 2.

TABLE 1

Contents of Impurity Elements Usually Contained in Alumina

| Impurity elements | Content (ppm) |
| --- | --- |
| Si | 60–350 |
| Fe | 30–200 |
| Cu | 0–20 |
| Ni | 0–20 |
| Ti | 0–60 |
| Mn | 0–30 |
| V | 0–30 |
| Sn | 0–30 |
| Zn | 0–60 |
| Cr | 0–30 |
| Pb | 0–30 |
| Zr | 0–15 |
| Bi | 0–10 |
| Ga | 30–200 |

TABLE 2

Contents (ppm) of Impurity Elements Usually Contained in Coke and Pitch

| Impurity elements | Content in coke | Content in pitch |
| --- | --- | --- |
| Si | 100–300 | 70–210 |
| Fe | 20–150 | 14–110 |
| Cu | 0–20 | 0–14 |
| Ni | 0–100 | 0–70 |
| Ti | 1–100 | 1–70 |
| Mn | 1–100 | 1–70 |
| V | 1–300 | 1–210 |
| Sn | 1–200 | 1–140 |
| Zn | 0–60 | 0–42 |
| Cr | 0–100 | 0–70 |
| Pb | 0–50 | 0–35 |
| Zr | 0–50 | 0–35 |
| Bi | 0–10 | 0–7 |
| Ga | 0–20 | 0–14 |

Although the impurities contained in the alumina (main raw material) and the carbon material for anode (additive raw material) are partly removed during electrolysis, a significant amount is transferred to the product. As a result, the maximum purity of primary aluminum obtained by electrolysis is 99.9 wt % (hereinafter referred to as 3N).

In the present specification, the purity of an aluminum base metal is defined as a value obtained by subtracting the total content of the main impurity elements of Si, Fe, Cu, Ni, Ti, Mn, V, Sn, Zn, Cr, Pb, Zr, Bi and Ga (14 elements) from 100 wt %.

On the other hand, in the field of electrolytic capacitors, magnetic discs and the like where demand for highly pure aluminum has been growing in recent years, aluminum having a purity of about 3N cannot meet the requirements for the properties of the capacitors, discs and the like; demand for highly pure aluminum having a purity of at least 99.95% (hereinafter referred to as 3N5) has been growing.

In order to surely meet the quality requirements explained above, the purity of the aluminum base metal has heretofore been improved by a secondary refining step, by the three layer electrolysis and by the segregation process. However, since the improvement requires a secondary refining step, the production cost rises, and the production efficiency declines.

DISCLOSURE OF INVENTION

An object of the present invention is to solve the problems related to the conventional technologies described above, and to provide a method of stably producing an aluminum primary base metal having a purity of at least 99.95 wt % (3N5) by electrolysis.

In order to achieve the object described above, a first invention of the present invention provides a method of producing a highly pure aluminum primary base metal, the method comprising placing, as a main raw material, alumina, the Si component of which has been decreased by acid cleaning, in a Hall-Heroult electrolysis cell.

In the acid cleaning, an aqueous solution of sulfuric acid, hydrofluoric acid, or sulfuric acid plus hydrofluoric acid etc. is used, and an acidic aqueous solution heated at temperature of at least 40° C. is particularly preferred from the standpoint of removing Si.

According to a second invention of the present invention, the object explained above is also achieved by a method, of producing an aluminum primary base metal, which comprises preparing an electrolysis anode by using deashed coke and/or pitch as a carbon material for the anode, and charging the electrolysis anode into a Hall-Heroult electrolysis cell as an additive raw material.

As a result of using the production methods of the first and the second invention in combination, a highly pure aluminum in which the impurity contents including the Si and the Fe content are further decreased can be produced.

BRIEF DESCRIPTION OF DRAWINGS

FIG. 1 is a graph showing the influence of the time of acid-cleaning alumina, on a residual Si content in acid cleaning, with an aqueous solution containing 10% of sulfuric acid.

FIG. 2 is a graph showing the influence of the time for acid-cleaning alumina, on a residual Si content in acid cleaning, with various aqueous solutions.

BEST MODE FOR CARRYING OUT THE INVENTION

Alumina produced by a conventional apparatus is basically used as the main raw material alumina. The alumina is produced by a process designed to decrease the inclusion amounts of Fe and Si components derived from the production apparatus.

Specifically, inclusion of the Fe and the Si component is suppressed by procedures including the following ones: aluminum hydroxide crystals precipitated after extracting bauxite with sodium hydroxide are more adequately cleaned in the step of separation filtering; moreover, in the step of calcining the filtered aluminum hydroxide crystals, the calcination temperature is lowered, and a calcination furnace lined with high alumina refractories having a low Si content is used.

The alumina thus produced is acid-cleaned before charging it into an electrolysis cell.

The present inventors have found that most of the impurities in alumina segregate in the surface layer of the alumina particles, and that removal of the surface layer portions thereof by acid cleaning greatly decreases the impurity content. Typically, 70% of the Si content of alumina segregate in the surface layer (volume ratio of 5 to 10%) of the alumina particles.

Acid cleaning dissolves and elutes $SiO_2$, $Fe_2O_3$ and trace impurity elements such as Zn contained in alumina and further transfers ultrafine particles to the solution system. Since impurities that exert adverse effects on the electrostatic capacity and the resistance to pressure of electrolytic capacitors when the aluminum is used therefor, and that cause troubles such as blisters when the aluminum is used for magnetic discs are removed by acid cleaning, the resultant alumina becomes a raw material for producing high quality aluminum primary base metal.

The alumina is usually dried after acid cleaning. Removal of impurities in the alumina proceeds to some extent even by water cleaning; however, the removal effect is small in comparison with acid cleaning.

A mixture of aggregate coke and binder pitch is used as a carbon material for anode of an additive raw material. Although examples of a raw material for aggregate coke include pitch coke obtained by calcining coal tar pitch, and oil coke obtained by calcining crude oil, pitch coke prepared from relatively highly pure coal tar is preferred.

The aggregate coke is prepared by deashing raw material coal tar and calcining the deashed tar. Although elements included in the raw material coal tar differ depending on the place of production of the coal, the coal tar usually contains 0.01 to 1% of an ash component mainly composed of $SiO_2$ and $Fe_2O_3$. Since these elements show the same behavior in the metal as in the alumina, the contents of these elements are desirably low when the aluminum is used for electrolytic capacitors, magnetic discs or the like. Accordingly, raw material coal tar is treated with an organic solvent, and the ash component of the coal tar is separated by redistillation to give highly pure coal tar. The resultant coal tar is then calcined, and the calcined coal tar is used as carbon aggregates for anode.

Prior to calcination of the coal tar, it is preferred to make the crystalline state during calcination equiaxed grains (granular crystals) by adding seeds for crystal formation and crystal growth of the raw material tar. The seeds are added for the following reasons. The crystallization direction of the coke obtained by calcining the raw material tar without adding the seeds become nonuniform, and needle-like crystals grow. The needle-like crystals show poor chemical reactivity when electrolysis is conducted using a carbon anode prepared by mixing aggregate coke and binder pitch. As a result, the proportion of the coke that does not contribute to an effective electrochemical reaction, and that is consumed mechanically or by mere combustion increases.

Deashed highly pure tar pitch is used as a binder for the anode of the additive raw material. The tar pitch can also be used without further processing; however, carbon black, mesophase carbon or crystallized carbon that is once pulverized is preferably added to the tar pitch to improve the binder properties, and the resultant tar pitch is preferably used.

The alumina (main raw material) and the carbon material for anode (additive raw material) thus prepared are charged into an electrolysis cell with fluorine compound-containing cryolite used as an electrolytic bath, and subjected to an electrolytic reaction. The charged alumina is dissolved in molten cryolite, and an electrolytic reduction reaction proceeds with the carbon electrode material being contacted with the molten cryolite bath. Metallic impurities such as Fe and Si contained in the main and additive raw materials are also dissolved into the molten cryolite to cause a reduction reaction, and part of them are vaporized as fluorides and discharged together with an exhaust gas.

The discharge proportion of the impurities increases in accordance with a reduction potential during the electrolysis. The discharge proportion of Fe is 30 wt %, and that of Ga is as much as 50 to 60 wt %. An exhaust gas containing impurities such as Fe and Ga as fluorine compounds is treated by wet recovery in which the fluorine component is absorbed into aqueous alkali. In the wet recovery, sodium hydroxide is commonly used for aqueous alkali for absorbing the exhaust gas, and the fluorine component is fixed as sodium fluoride (NaF). The NaF is treated with sodium aluminate or aluminum sulfate to regenerate cryolite. Although the regenerated cryolite can be recycled as an electrolytic bath, the cryolite is unsuitable for the production of highly pure aluminum because it contains impurities. On the other hand, the dry scrubbing method in which a discharged fluoride is absorbed into the raw material alumina is not preferred because the method results in recovering even discharged impurities.

The aluminum primary base metal obtained by electrolysis using the alumina (main raw material) and/or the carbon material (additive raw material) for anode thus prepared is a highly pure base metal having a quality comparable to or practically identical to the conventional secondary refined base metal.

EXAMPLES

Example 1

Using a production apparatus that suppressed the inclusion of Fe, Si and the like, a calcined alumina Al having a Si content of 40 to 60 ppm was produced. The calcined alumina was acid-cleaned under various conditions, and the residual Si content of the calcined alumina was measured. The following acid cleaning conditions were selected. The acid cleaning was conducted at temperatures at two levels: 60° C. and 80° C. The acid cleaning was conducted in solutions at 3 levels: an aqueous solution containing 10% of sulfuric acid; an aqueous solution containing 0.5% of hydrofluoric acid; and an aqueous solution containing 10% of sulfuric acid and 0.5% of hydrofluoric acid.

When the relationship between a measured value of a residual Si content and an acid-cleaning time was examined, it was found that the residual Si content fell in accordance with the lapse of the acid-cleaning time. As shown in FIG. 1, in acid cleaning with an aqueous solution containing 10% of sulfuric acid (80° C.), alumina (hereinafter referred to as highly pure alumina S) having a Si content that was lowered to not greater than half of that of the alumina prior to the acid cleaning was obtained after acid cleaning for 40 minutes. As shown in FIG. 2, in acid cleaning with an aqueous solution containing 0.5% of hydrofluoric acid, or 10% of sulfuric acid plus 0.5% of hydrofluoric acid (60°C., 80° C.), alumina (hereinafter referred to as highly pure alumina SF) having a Si content that was lowered to not greater than ¼ of that of the alumina prior to the acid cleaning was obtained after acid cleaning for 20 or 30 minutes. However, a decrease in the Fe content caused by acid cleaning was very slight.

The recovery of alumina subsequent to cleaning was 99% when non-acid-treated alumina was treated for 40 minutes with an aqueous solution containing 10% of sulfuric acid (60° C., 80° C.), and 94% when non-acid-treated alumina was treated for 20 minutes with an aqueous solution containing 0.5% of hydrofluoric acid, or 10% of sulfuric acid plus 0.5% of hydrofluoric acid (60° C., 80° C.).

Highly pure alumina S was supplied to an electrolysis cell in which a conventional anode material was used and, when the molten aluminum in process, stored within the cell, was completely replaced, the contents of the impurities were measured. As a result, the content of the impurity Si was lowered from the level of 200 ppm when charging alumina that was not acid-cleaned to the level of 140 ppm or less (a decrement of 60 ppm).

Table 3 shows the contents of the main impurities described above and the purity of the aluminum base metal. In addition, Table 3 also shows, for comparison, conventional field-proven values obtained by procedures wherein a conventional anode material that was not deashed was used, alumina was produced by a conventional alumina production apparatus, and the alumina was not cleaned.

TABLE 3

Contents (ppm) of Impurities and Purities (wt %) of Aluminum Base Metals

|  | Example 1 | Conventional Example |
| --- | --- | --- |
| Alumina | A Company, alumina S | A Company, commercial |
| Coke | Conventional | Conventional |
| Pitch | Conventional | Conventional |
| Impurity Elements |  |  |
| Si | 100–140 | 180–200 |
| Fe | 135–170 | 200–250 |
| Cu | 1–5 | 10–20 |
| Ni | 1 | 1 |
| Ti | 20–30 | 20–30 |
| Mn | 5 | 5–7 |

TABLE 3-continued

Contents (ppm) of Impurities and Purities (wt %) of Aluminum Base Metals

|  | Example 1 | Conventional Example |
| --- | --- | --- |
| V | 1–2 | 2–3 |
| Sn | 5 | 5 |
| Zn | 25–35 | 25–35 |
| Cr | 2 | 1 |
| Pb | 3–5 | 3–5 |
| Zr | 5 | 5 |
| Bi | 1 | 1 |
| Ga | 70–100 | 70–100 |
| Purity of base metal | 99.963–99.949 | 99.947–99.934 |

Note:
Table 3 shows analytical results obtained by sampling once a day for a test period (3 months).
Each of the data shown in a range is a maximum and a minimum value during the test period (3 months). Each of the data shown as a single numerical value is a value that did not vary within the significant digit or digits.

As shown in Table 3, even the upper limit of the field-proven values is slightly smaller than the purity 99.95 wt %, and the lower limit thereof is significantly smaller than the purity 99.95 wt % in Conventional Example. In contrast to the results explained above, in Example 1 in which alumina was cleaned according to the present invention, all the field-proven values including the lower limit substantially attained the purity 99.95 wt %.

As explained above, the present invention can stably ensure the purity 99.95 wt %.

Example 2

Carbon black fine powder was added to highly pure coal tar obtained by dissolving coal tar pitch in an organic solvent, and redistilling the solution to effect deashing. The mixture was calcined at an average calcination temperature of 1,100° C. to give aggregate coke for electrolysis anode. Moreover, electrode-impregnating pitch prepared by deashing and adding carbon black in the same manner as explained above was purchased as binder pitch for anode. The Fe content of the purchased highly pure coke and that of the highly pure pitch were 2 ppm and 5 ppm, respectively; the Si content thereof and that of the highly pure pitch were 5 ppm and 5 ppm, respectively; the Cu content thereof and that of the highly pure pitch were less than 1 ppm and less than 1 ppm, respectively. The total content of the other impurity elements excluding Al of the purchased coke and that of the highly pure pitch were each less than 3 ppm.

Highly pure self-firing anode briquettes were produced using the aggregate coke and electrode-impregnating pitch. The briquettes were charged into the top of the anode of an electrolysis cell to be made in process. Alumina produced in the step designed to decrease the inclusion amounts of Fe and Si, was supplied when the anode reached the reaction surface, i.e., in about 3 months; moreover, when the molten aluminum in process stored within the cell was completely replaced, the contents of the impurities were measured. As a result, it was found that the content of impurity Fe was lowered from the level of 250 ppm to 90 ppm or less, and that the content of impurity Si was lowered from the level of 200 ppm to 120 ppm or less.

Table 4 shows the contents of the main impurities and the purity of the aluminum base metal described above. In addition, Table 4 also shows, for comparison, conventional field-proven values obtained by a procedure wherein a conventional anode material that was not deashed was used, alumina was produced by a conventional alumina production apparatus, and the alumina was not cleaned.

TABLE 4

Contents (ppm) of Impurities and Purities (wt %) of Aluminum Base Metals

|  | Example 2 | Conventional Example |
|---|---|---|
| Alumina | A Company, commercial (*) | A Company, commercial |
| Coke | Deashed | Conventional |
| Pitch | Deashed | Conventional |
| Impurity elements |  |  |
| Si | 100–120 | 180–200 |
| Fe | 65–90 | 200–250 |
| Cu | 1–5 | 10–20 |
| Ni | 1> | 1 |
| Ti | 20–30 | 20–30 |
| Mn | 5 | 5–7 |
| V | 1 | 2–3 |
| Sn | 5 | 5 |
| Zn | 5–15 | 25–35 |
| Cr | 2 | 1 |
| Pb | 1> | 3–5 |
| Zr | 5 | 5 |
| Bi | 1 | 1 |
| Ga | 70–90 | 70–100 |
| Purity of base metal | 99.972–99.963 | 99.947–99.934 |

Note:
Table 4 shows analytical results obtained by sampling once a day for a test period (3 months).
Each of the data shown in a range is a maximum and a minimum value during the test period (3 months). Each of the data shown as a single numerical value is a value that did not vary within the significant digit or digits.
(*) A step in which the inclusion amounts of the Fe and the Si component were decreased was performed.

As shown in Table 4, the field-proven values did not attain the purity 3N5 in Conventional Example. In contrast to the results explained above, in Example 2 in which coke and pitch (anode materials) were deashed according to the present invention, all the field-proven values including the lower limit attained the purity 3N5.

As explained above, according to the present invention, a purity of at least 99.95 wt % (3N5) can be stably ensured for the aluminum base metal.

Concerning the effect of decreasing the amount of impurities by deashing the anode materials in the present example, it should be particularly noted that the Pb content was lowered from the conventional value of 3 to 5 ppm to less than 1 ppm.

For example, when the aluminum base metal is worked to form a foil for an electrolytic capacitor, the foil must be heat-treated, whereby Pb is concentrated on the foil surface. As a result, the foil surface portion subsequent to the heat treatment has a Pb content that is from 10 to 100 times as great as the average Pb content. The concentration of Pb therefore exerts adverse effects on the capacitor characteristics. No such adverse effects are produced after decreasing the Pb content in the present invention.

Example 3

The following aggregate coke for electrolysis anode was purchased and prepared. In the same manner as in Example 2, carbon black fine powder was added to highly pure coal tar obtained by dissolving coal tar pitch in an organic solvent, and redistilling the solution to effect deashing. The mixture was calcined at an average calcination temperature of 1,100° C. to give aggregate coke for electrolysis anode. Conventional electrode pitch was purchased and prepared as binder pitch for anode. The purity of the purchased highly pure coke was the same as in Example 2. The purchased conventional electrode pitch had an Fe content of 37 ppm, a Si content of 171 ppm and a Cu content of less than 1 ppm.

Self-firing anode briquettes were produced using the aggregate coke and electrode pitch. The briquettes were charged into the top of the anode of an electrolysis cell to be made in process. Alumina produced in the step that was designed to decrease the inclusion amount of the Fe and the Si component was supplied at the stage where the anode reached the reaction surface in about 3 months; moreover, when the molten aluminum in process stored within the cell was completely replaced, the contents of the impurities were measured. As a result, it was found that the content of impurity Fe was lowered from the level of 250 ppm to 150 ppm, and that the content of impurity Si was lowered from the level of 200 ppm to 170 ppm.

Table 5 shows the contents of the main impurities and the purity of the aluminum base metal described above. In addition, Table 5 also shows for comparison conventional field-proven values obtained by a procedure wherein a conventional anode material that was not deashed was used, and alumina was not cleaned.

TABLE 5

Contents (ppm) of Impurities and Purities (wt %) of Aluminum Base Metals

|  | Example 3 | Conventional Example |
|---|---|---|
| Alumina | A Company, commercial (*) | A Company, commercial |
| Coke | Deashed | Conventional |
| Pitch | Conventional | Conventional |
| Impurity elements |  |  |
| Si | 120–145 | 180–200 |
| Fe | 70–95 | 200–250 |
| Cu | 1–5 | 10–20 |
| Ni | 1 | 1 |
| Ti | 20–30 | 20–30 |
| Mn | 5–6 | 5–7 |
| V | 1 | 2–3 |
| Sn | 5 | 5 |
| Zn | 20–30 | 25–35 |
| Cr | 1 | 1 |
| Pb | 2 | 3–5 |
| Zr | 5 | 5 |
| Bi | 1 | 1 |
| Ga | 70–90 | 70–100 |
| Purity of base metal | 99.967–99.958 | 99.947–99.934 |

Note:
Table 5 shows analytical results obtained by sampling once a day for a test period (3 months).
Each of the data shown in a range is a maximum and a minimum value during the test period (3 months). Each of the data shown as a single numerical value is a value that did not vary within the significant digit or digits.
(*) A step in which the inclusion amounts of the Fe and the Si component were decreased was performed.

As shown in Table 5, even the upper limit of the field-proven values in Conventional Example did not attain the purity 3N5. In contrast to the results explained above, in Example 3 in which coke (anode material) alone was deashed, all the field-proven values including the lower limit attained the purity 3N5.

The effect of decreasing impurities by deashing coke alone in the present example is small in comparison with the example in which both the coke and pitch were deashed.

That is, it is more desirable to deash both the coke and pitch than to deash the coke alone.

As explained above, according to the present invention, a purity of at least 99.95 wt % (3N5) can be stably ensured for the aluminum base metal.

Although the effect of decreasing Pb is more reduced in the present example than in Example 2, the content of Pb was lowered from the conventional value of 3 to 5 ppm to 2 ppm.

Example 4

The highly pure self-firing anode briquettes used in Example 2 were charged into the top of the anode of an electrolysis cell to be made in process. When the anode reached the reaction surface, i.e., in about 2 months, supply of highly pure alumina S was started.

When molten aluminum in process stored within the cell was completely replaced, the contents of the impurities were measured. It is seen from the measurement results in Table 3 that as a result of using highly pure alumina S, deashed coke and deashed pitch, aluminum primary base metals each having an Si content of 60 ppm or less, and an Fe content of 80 ppm or less were obtained.

Table 6 shows the contents of the main impurities and the purities of the aluminum base metals described above. In addition, Table 6 also shows for comparison conventional field-proven values obtained by a procedure wherein a conventional anode material that was not deashed was used, alumina was produced with a conventional alumina production apparatus, and the alumina was not cleaned.

TABLE 6

Contents (ppm) of impurities and Purities (wt %) of Aluminum Base Metals

| | Example 4 | | Conventional Example |
|---|---|---|---|
| Alumina | A Company, alumina S | B Company, alumina S | A Company, commercial |
| Coke | Deashed | Deashed | Conventional |
| Pitch | Deashed | Deashed | Conventional |
| Impurity elements | | | |
| Si | 40–60 | 40–60 | 180–200 |
| Fe | 50–80 | 45–70 | 200–250 |
| Cu | 1–5 | 1–5 | 10–20 |
| Ni | 1> | 1> | 1 |
| Ti | 20–30 | 10–20 | 20–30 |
| Mn | 5 | 2 | 5–7 |
| V | 1 | 1 | 2–3 |
| Sn | 5 | 1 | 5 |
| Zn | 5–15 | 3–10 | 25–35 |
| Cr | 2 | 1 | 1 |
| Pb | 1> | 1> | 3–5 |
| Zr | 5 | 2 | 5 |
| Bi | 1 | 1> | 1 |
| Ga | 70–90 | 30–40 | 70–100 |
| Purity of base metal | 99.980–99.970 | 99.986–99.979 | 99.947–99.934 |

Note:
Table 6 shows analytical results obtained by sampling once a day for a test period (3 months).

TABLE 6-continued

Contents (ppm) of impurities and Purities (wt %) of Aluminum Base Metals

| | Example 4 | Conventional Example |
|---|---|---|

Each of the data shown in a range is a maximum and a minimum value during the test period (3 months). Each of the data shown as a single numerical value is a value that did not vary within the significant digit or digits.

As shown in Table 6, the field-proven values in Conventional Example did not attain the purity 3N5.

In contrast to the results explained above, in Example 4 in which the anode materials were deashed and/or the alumina was cleaned, all the field-proven values including the lower limit exceeded the purity 3N5, and attained the purity of at least 99.97 wt % which is close to 4N.

As explained above, the present invention can stably ensure the purity of at least 99.95 wt % (3N5).

INDUSTRIAL APPLICABILITY explained above, in the present invention, alumina the Si component of which is decreased by acid cleaning is used as a main raw material, and electrolysis is conducted to give a highly pure aluminum primary base metal having a purity of at least 99.95 wt % (3N5). Moreover, use of a deashed carbon material for anode in combination with the alumina gives an aluminum primary base metal meeting the requirements for the properties of electrolytic capacitors, discs and the like and having a purity close to the purity 4N of an aluminum secondary refined base metal.

What is claimed is:

1. A method of producing a highly pure aluminum primary base metal, comprising placing alumina, the Si content of which has been decreased by acid cleaning, in a Hall-Heroult electrolysis cell as a main raw material.

2. The method according to claim 1, wherein alumina having been acid-cleaned with an aqueous solution of sulfuric acid and/or hydrofluoric acid is used.

3. The method according to claim 1, wherein deashed coke and/or pitch is used as a carbon material for an anode.

4. A method of producing a highly pure aluminum primary base metal, comprising preparing an electrolysis anode using deashed coke and/or pitch as a carbon material for the anode, and charging the electrolysis anode into a Hall-Heroult electrolysis cell as an additive raw material;

wherein the deashed coke is prepared by treating a raw material coal tar with an organic solvent, deashing the treated coal tar by redistillation and calcining the deashed coal tar, and the deashed pitch is prepared by treating a raw material coal tar pitch with an organic solvent and deashing the treated coal tar pitch by redistillation.

* * * * *